US012621658B2

(12) United States Patent
Chen et al.

(10) Patent No.:  US 12,621,658 B2
(45) Date of Patent:        May 5, 2026

(54) SECURITY IMPROVEMENTS IN SL UNICAST

(71) Applicant: Apple Inc., Cupertino, CA (US)

(72) Inventors: Yuqin Chen, Beijing (CN); Birgit Breining, Munich (DE); Dawei Zhang, Saratoga, CA (US); Fangli Xu, Beijing (CN); Haijing Hu, Los Altos, CA (US); Longda Xing, San Jose, CA (US); Rama Diwakara Rao Noolu, Fremont, CA (US); Sethuraman Gurumoorthy, San Ramon, CA (US); Shu Guo, Beijing (CN); Srirang A. Lovlekar, Fremont, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 17/995,369

(22) PCT Filed: Apr. 8, 2020

(86) PCT No.: PCT/CN2020/083775
§ 371 (c)(1),
(2) Date: Oct. 3, 2022

(87) PCT Pub. No.: WO2021/203301
PCT Pub. Date: Oct. 14, 2021

(65) Prior Publication Data
US 2023/0345236 A1     Oct. 26, 2023

(51) Int. Cl.
*H04W 12/037*     (2021.01)
*H04L 9/08*     (2006.01)
(Continued)

(52) U.S. Cl.
CPC ......... *H04W 12/037* (2021.01); *H04L 9/0891* (2013.01); *H04W 12/106* (2021.01); *H04W 76/14* (2018.02); *H04W 76/30* (2018.02)

(58) Field of Classification Search
CPC . H04W 12/037; H04W 12/106; H04W 76/14; H04W 76/30; H04W 12/03;
(Continued)

(56) References Cited

U.S. PATENT DOCUMENTS

2002/0159444 A1 *   10/2002   Vialen ..................... H04L 43/00
                                                                       370/465
2014/0269343 A1      9/2014   Nagatsuka
(Continued)

FOREIGN PATENT DOCUMENTS

CN          105103610         11/2015
CN          109565333 A        4/2019
(Continued)

OTHER PUBLICATIONS

Universal Mobile Telecommunications System (UMTS); LTE; Proximity-services (ProSe) User Equipment (UE) to ProSe function protocol aspects; Stage 3 (3GPP TS 24.334 version 15.2.0 Release 15) pp. 1-262 (Year: 2018).*
(Continued)

*Primary Examiner* — Joseph P Hirl
*Assistant Examiner* — Thomas A Gyorfi
(74) *Attorney, Agent, or Firm* — Fay Kaplun & Marcin, LLP

(57) ABSTRACT

The exemplary embodiments relate to a computer-readable storage medium, a device, an integrated circuit and a method that perform operations related to a first user equipment (UE) configured with a sidelink (SL) connection with a second UE. The operations include generating an SL counter check request including at least a first count for data trans-
(Continued)

missions from the first UE to the second UE as determined by the first UE. The operations further include transmitting the request to the second UE and receiving a counter check response to the request, the response comprising at least a second count for data transmissions from the first UE to the second UE as determined by the second UE. The operations further include determining a first difference between the first count and the second count and, when the first difference exceeds a threshold, releasing the SL connection with the second UE.

17 Claims, 4 Drawing Sheets

(51) Int. Cl.

| | | |
|---|---|---|
| *H04W 12/106* | (2021.01) | |
| *H04W 76/14* | (2018.01) | |
| *H04W 76/30* | (2018.01) | |

(58) Field of Classification Search
CPC ... H04W 4/70; H04W 12/047; H04W 12/122; H04W 28/06; H04W 92/18; H04L 9/0891; H04L 63/0428; H04L 63/1466; H04L 69/04
See application file for complete search history.

(56) References Cited

U.S. PATENT DOCUMENTS

| | | | | |
|---|---|---|---|---|
| 2016/0380779 A1 | 12/2016 | Sharma et al. | | |
| 2019/0058986 A1 | 2/2019 | Loehr et al. | | |
| 2019/0215719 A1* | 7/2019 | Wei | | H04W 28/06 |
| 2020/0137638 A1* | 4/2020 | Kim | | H04W 36/0011 |
| 2020/0236579 A1* | 7/2020 | Cho | | H04W 24/10 |
| 2020/0245401 A1* | 7/2020 | Ingale | | H04W 28/06 |
| 2020/0314796 A1* | 10/2020 | Lee | | H04W 68/02 |
| 2022/0038943 A1* | 2/2022 | Hu | | H04W 24/08 |
| 2022/0124489 A1* | 4/2022 | Lu | | H04W 76/23 |

FOREIGN PATENT DOCUMENTS

| | | |
|---|---|---|
| CN | 110139322 | 8/2019 |
| CN | 110177353 | 8/2019 |
| CN | 110460589 A | 11/2019 |
| CN | 110784904 | 2/2020 |
| EP | 3 113 527 | 1/2017 |
| EP | 3499747 A1 | 6/2019 |
| GB | 2 522 665 | 8/2015 |
| JP | 2017-510162 | 4/2017 |

| | | |
|---|---|---|
| WO | 01/63853 | 8/2001 |
| WO | 2014/104853 | 7/2014 |
| WO | 2017/138977 | 8/2017 |
| WO | 2020/017807 | 1/2020 |

OTHER PUBLICATIONS

3rd Generation Partnership Project; Technical Specification Group Services and System Aspects; Security aspects of 3GPP support for advanced Vehicle-to-Everything (V2X) services; (Release 16); 3GPP TS 33.536 V1.0.0; Mar. 12, 2020, 22 sheets.

CATT (rapporteur), "Summary of offline discussion for open issues on V2X PDCP (CATT)", 3GPP TSG RAN WG2#109-e, R2-2001977, Mar. 11, 2020, 15 sheets.

3rd Generation Partnership Project; Technical Specification Group Radio Access Network; NR; Packet Data Convergence Protocol (PDCP) specification; (Release 16); 3GPP TS 38.323 V16.0.0, Apr. 7, 2020, 37 sheets.

Huawei, et al., "Introduction of 5G V2X with NR sidelink", 3GPP TSG-RAN2 WG2 Meeting #108, R2-2001966, Mar. 12, 2020, 491 sheets.

Samsung, "Security impact in SL PDCP", 3GPP TSG-RAN WG2 Meeting#109-e, R2-2001340, Feb. 14, 2020, 2 sheets.

Samsung, "AS-layer configuration failure case in SL unicast" 3GPP TSG-RAN WG2 Meeting #108, R2-1916213, Nov. 8, 2019, 2 sheets.

ZTE, "Periodic Local Authentication", 3GPP TSG-SA WG3 Security Meeting #54, S3-090134, Jan. 19-23, 2009, 3 sheets.

Ericsson, "Summary of email discussion [107#75][NR/V2X] RLF", 3GPP TSG-RAN WG2 #107bis, R2-1913328, Oct. 14-18, 2019, 26 sheets.

Huawei et al., "Potential issue on the Counter Check in (NG)EN-DC and NR standalone", 3GPP TSG-RAN WG2 Meeting #109-e, R2-2001180, Feb. 24 through Mar. 6, 2020, 3 sheets.

Qualcomm Incorporated, "Security handling in PDCP for ProSe Direction Communication", 3GPP TSG-RAN WG2#88, R2-145194, Nov. 17-21, 2014, 4 sheets.

ZTE Corporation et al., "Discussion on left issue of NR V2X PDCP", 3GPP TSG-RAN WG2 #107bis, Oct. 3, 2019, R2-1912382, 5 sheets.

CATT, "Remaining Issues on PDCP",3GPP TSG-RAN WG2 Meeting #108, Nov. 8, 2019, R2-1914444, 6 sheets.

Ericsson, "ROHC handling in MBB handover", 3GPP TSG-RAN WG2 #107, Aug. 15, 2019, R2-1908962, 8 sheets.

Vivo, "TP for 38.323 of EHC", 3GPP TSG-RAN WG2 Meeting #107bis, Oct. 4, 2019, R2-1912314, 11 sheets.

Huawei et al., "Summary of email discussion [108#44][V2X]—Miscellaneous RRC issues for 5G V2X with NR Sidelink", 3GPP TSG-RAN WG2 Meeting #109 electronic, Feb. 18, 2020, R2-2000757, 13 sheets.

* cited by examiner

SECURITY IMPROVEMENTS IN SL UNICAST

BACKGROUND INFORMATION

A user equipment (UE) may be configured with multiple communication links. For example, the UE may receive a signal from a cell of a corresponding network over a downlink and may transmit a signal to the cell of the corresponding network over an uplink. The UE may also be configured to communicate with a further UE via a sidelink (SL). The term sidelink refers to a communication link that may be utilized for device-to-device (D2D) communication. Thus, the SL may facilitate communication between the UE and the further UE without the use of a cell. Various security-related issues may arise in SL communications.

SUMMARY

In some exemplary embodiments, a computer readable storage medium comprises a set of instructions that when executed by a processor cause the processor to perform operations. The computer readable storage medium may be embodied in a first user equipment (UE) configured with a sidelink (SL) connection with a second UE. The operations include generating an SL counter check request comprising at least a first count for data transmissions from the first UE to the second UE as determined by the first UE The operations further comprise transmitting the request to the second UE and receiving a counter check response to the request, the response comprising at least a second count for data transmissions from the first UE to the second UE as determined by the second UE. The operations further comprising determining a first difference between the first count and the second count and, when the first difference exceeds a threshold, releasing the SL connection with the second UE.

In further exemplary embodiments, a computer readable storage medium comprises a set of instructions that when executed by a processor cause the processor to perform operations. The computer readable storage medium may be embodied in a first user equipment (UE) configured with a sidelink (SL) connection with a second UE. The operations include initiating an upper layer rekeying. The operations further comprising resetting a header compression protocol for the SL connection for data radio bearers (DRBs) used in the SL connection and discarding all stored packet data convergence protocol (PDCP) protocol data units (PDUs) and service data units (SDUs). The operations further comprising applying a new ciphering algorithm and a new integrity protection algorithm to the DRBs, generating updated PDCP PDUs using the new ciphering and integrity protection algorithms, and submitting the updated PDCP PDUs to lower layers.

In still further exemplary embodiments, a computer readable storage medium comprises a set of instructions that when executed by a processor cause the processor to perform operations. The computer readable storage medium may be embodied in a first user equipment (UE) configured with a sidelink (SL) connection with a second UE and operates with packet data convergence protocol (PDCP) duplication, where multiple logical channels are used, determining a primary SL RLC entity corresponding to a primary logical channel, the primary SL RLC entity having a primary SL RLC identifier (ID) and the primary logical channel having a primary logical channel ID. The operations include transmitting to the second UE an indication that PDCP duplication is in use and the primary SL RLC ID, wherein the second UE uses the primary logical channel ID corresponding to the primary SL RLC ID to decipher transmissions from the first UE.

DETAILED DESCRIPTION

Figure 1:
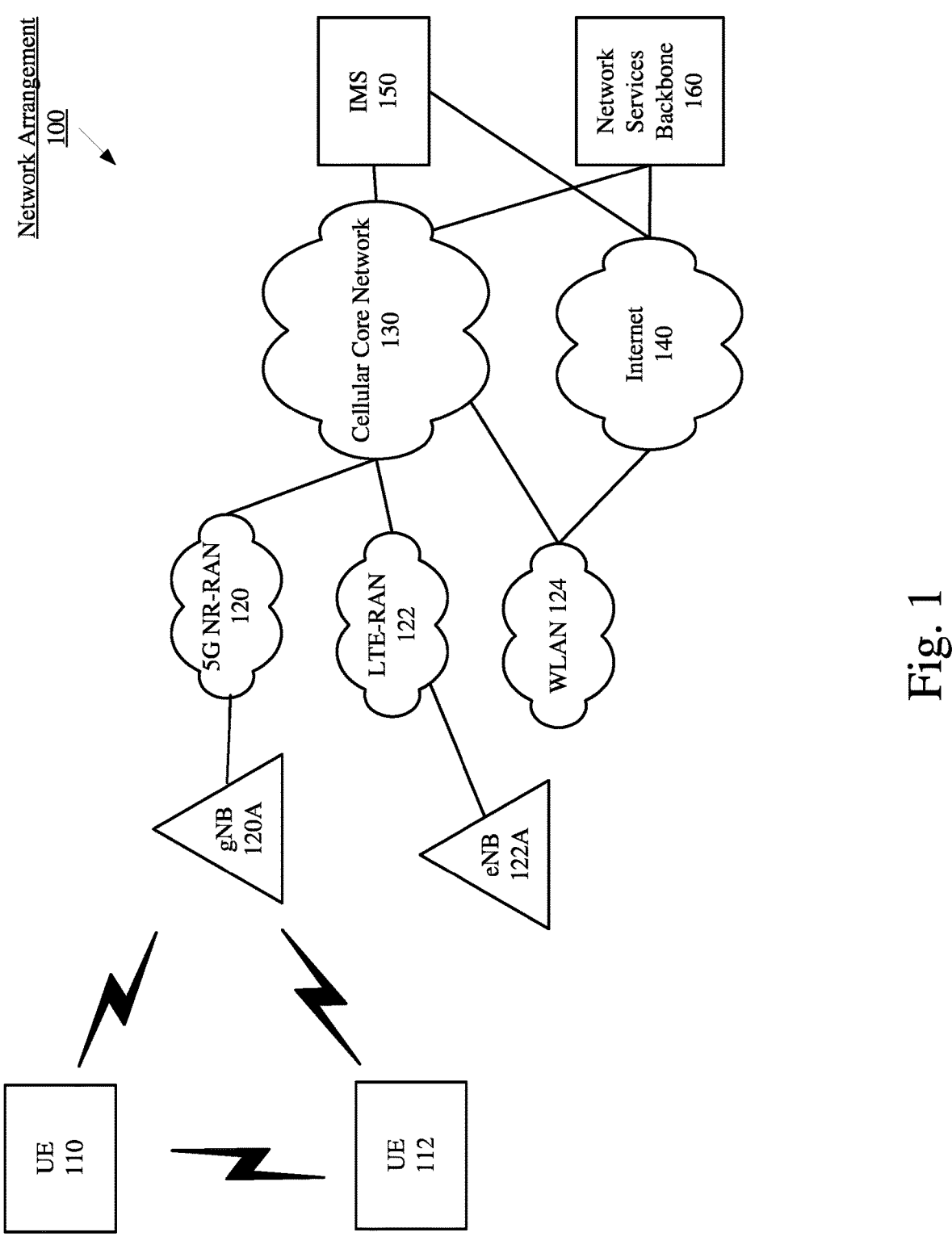
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to mechanisms performed at one or more user equipment (UEs) for addressing security-related issues for sidelink (SL) unicast communications. As will be described in detail below, various issues may arise in current SL unicast communications, including a potential for "man-in-the-middle" attacks, failures to properly re-key, and difficulties in determining a correct input for security algorithms.

The exemplary embodiments are described with regard to a UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a sidelink (SL). The term "sidelink" generally refers to a communication link between the UE and a further UE. The SL provides direct device-to-device (D2D) communication where information and/or data exchanged between the UE and the further UE via the sidelink does not go through a cell. In some configurations, a single sidelink provides bidirectional data communication between the UE and the further UE. In other configurations, a single sidelink provides unidirectional data communication between the UE and the further UE, although signaling may be transmitted in both directions. The term "unicast" refers to one-to-one, i.e. D2D, device communication and generally may refer to either bidirectional or unidirectional communication. Various embodiments may apply to either one or both forms of communication as indicated below.

SL communications are supported by both Long-Term Evolution (LTE) and 5G new radio (NR) standards. In some configurations, the network may provide information to the UE that indicates how an SL is to be established, maintained and/or utilized. Thus, while the information and/or data exchanged over the SL does not go through a cell, the UE and the network may exchange information associated with the SL. In other configurations, an SL is not under the control of the network. In either configuration, the first UE and the second UE may still perform synchronization procedures, discovery procedures and exchange control information corresponding to the SL.

A first issue that may arise in SL unicast communications is a potential for a packet insertion attack to occur, particularly in vehicle to everything (V2X) transmissions. When SL unicast security is disabled, a "man-in-the-middle"-type attack may occur, where an attacking device records, relays, and/or alters communications between communicating devices.

According to a first aspect of the exemplary embodiments, an SL counter check procedure is implemented, particularly as a backup security procedure for situations such as when SL unicast security is disabled. As will be described in further detail below, a first UE may send an SL counter check request indicating a count for data transmissions sent to and/or received from UE2. The UE2 may respond with a corresponding count for the data transmissions sent to and/or received from UE1. When a mismatch between the respective counts exceeding a threshold is determined, indicating a potential "man-in-the-middle" has compromised the SL connection between the UEs, the connection is released, and the security issue is reported to the network.

A second issue that may arise in SL unicast communications is that currently the SL packet data convergence protocol (PDCP) does not support PDCP re-establishment. PDCP re-establishment is a procedure for when an upper layer performs rekeying, e.g., generating a new set of keys for decrypting encrypted messages.

According to a second aspect of the exemplary embodiments, functions are defined for a UE to perform a re-establishment procedure upon upper layer rekeying. As will be described in further detail below, updated ciphering and integrity protection algorithms are provided to a PDCP entity, the algorithms are applied to the relevant radio bearers, and updated PDCP Data PDUs are generated for the SL communication link.

A third issue that may arise SL unicast transmissions is that a logical channel ID is used as input for the key stream calculation instead of the bearer ID, causing complications when PDCP duplication is in use. PDCP duplication is a mechanism where multiple, i.e. at least two, logical channels are mapped to a single SL radio bearer. When SL PDCP duplication is in use it is unclear which of the multiple logical channel IDs to use for the SL RB. Although in 3GPP Rel-16 PDCP duplication is not supported, PDCP duplication may be enabled in future releases and a mechanism to support the scheme is needed.

According to a third aspect of the exemplary embodiments, a primary SL RLC entity (equal to a logical channel) is configured when SL PDCP duplication is in use, the ID of the primary RLC entity to be used as input for the security algorithm in the PDCP layer.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc.

Throughout this description, the terms UE 110, UE and transmitting device may be used interchangeably. Additionally, the terms UE 112, further UE and receiving device may be also used interchangeably. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support vehicle-to-everything (V2X) and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain a downlink/uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
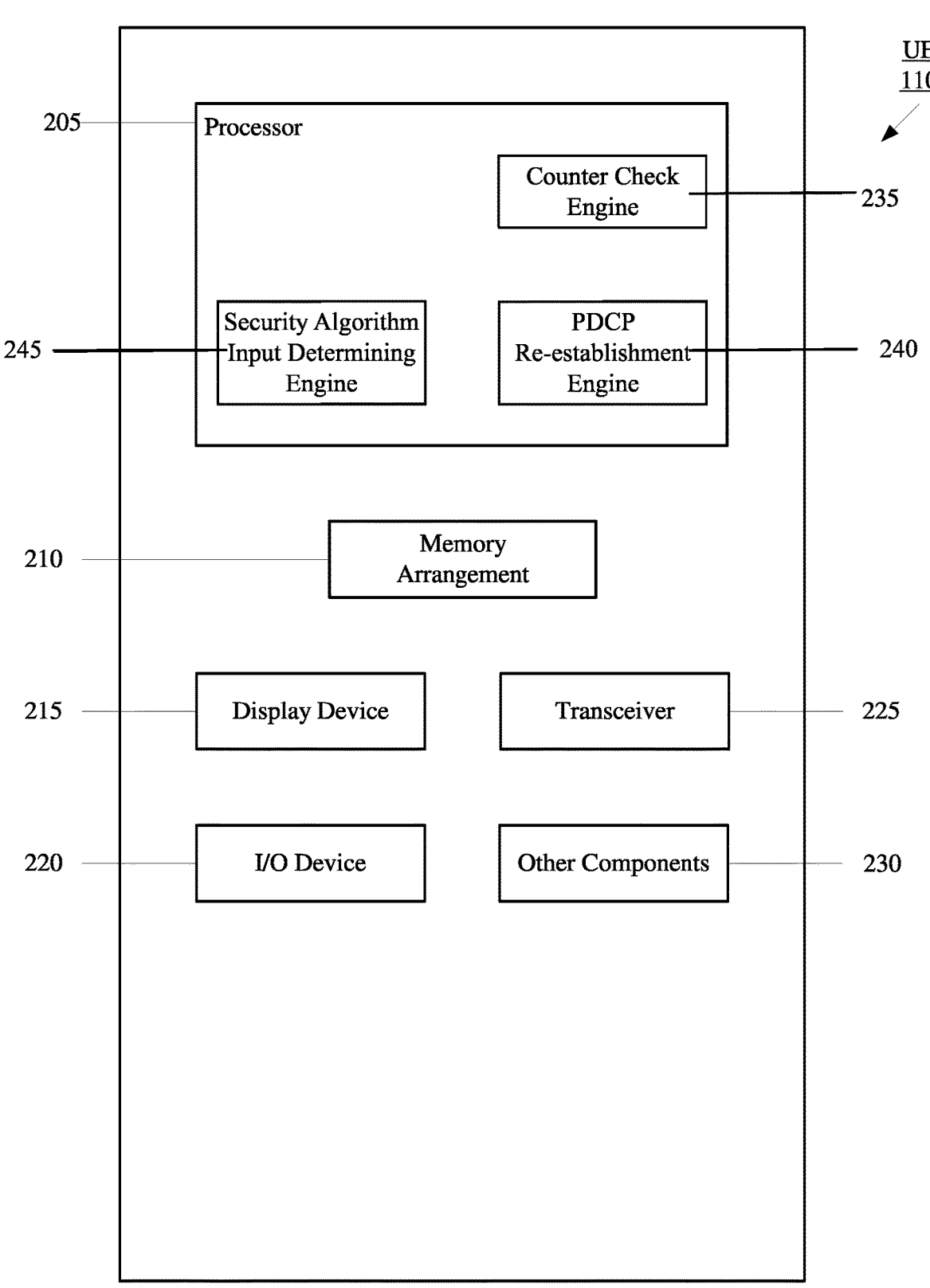
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, and other components 230. The other components 230 may include, for example, a SIM card, an embedded SIM (eSIM), an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a counter check engine 235, a PDCP re-establishment engine 240, and a security algorithm input determining engine 245. As will be described below, the counter check engine 235 may be operable to initiate and/or respond to a counter check request for comparing data transmission counts between two UEs in SL communication. The PDCP re-establishment engine 240 may initiate a PDCP re-establishment and/or refresh PDCP PDUs/SDUs with updated ciphering and/or integrity protection algorithms. The security algorithm input determining engine 245 may identify one of multiple SL RLC entities as a primary entity and indicate said primary entity to a second UE and/or use a primary SL logical channel ID (corresponding to the primary SL RLC entity) to decipher transmissions.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

As mentioned above, a first exemplary embodiment relates to a detection of a "man-in-the-middle", i.e. an attacking device, between two UEs communicating via SL. The exemplary counter check mechanism described below, where data transmissions between the two UEs are counted, may indicate the presence of the attacking device when a mismatch between the respective counts is determined.

Figure 3:
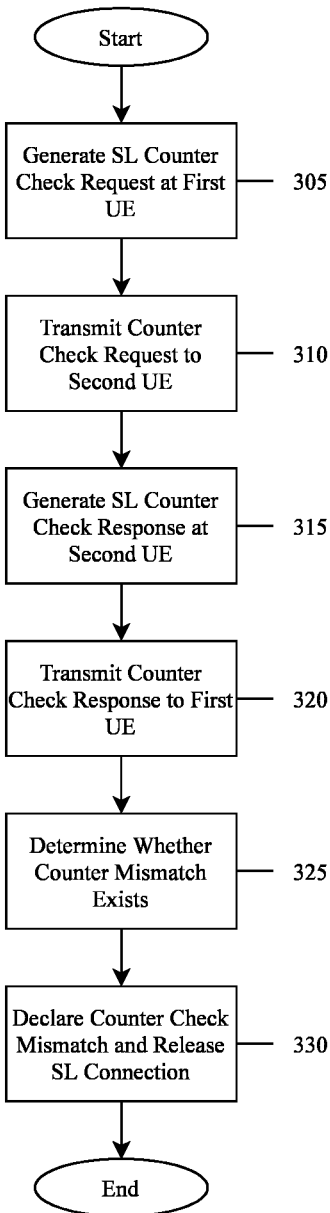
FIG. 3 shows a method for implementing a count check procedure in SL unicast communication between a first UE and a second UE according to various exemplary embodiments.

FIG. 3 shows a method 300 for implementing a count check procedure in SL unicast communications between a first UE, e.g. UE 110, and a second UE, e.g. UE 112. The exemplary procedure may be used in either unidirectional communication or bidirectional communication as described below. The count check procedure as described herein may be performed at various intervals. For example, the count check may be performed for every message exchange, may be performed periodically (e.g., every X seconds), may be performed based on an event, (e.g., every Y communications), etc.

In 305, either one of the first UE and the second UE initiates the counter check procedure by generating an SL counter check request. The counter check request comprises an information elements (IE) including a first count for indicating a count for data transmissions in a first of two directions, e.g. from the first UE to the second UE, and a second count for indicating a count for data transmissions in the second of the two directions, e.g. from the second UE to the first UE. In some exemplary embodiments, the IE may further include one or both of a radio bearer (RB) identifier (RB ID) and/or a logical channel ID for the data transmissions. In some exemplary embodiments, a separate counter may be used for each RB or logical channel, so when multiple RBs and/or logical channels are used, counters for the above-noted transmission directions may be listed for each of the RB IDs and/or logical channel IDs. For example, if it were considered that there were two RBs (e.g., RB1 and RB2) established between the first UE and the second UE, the request IE may include a list of RBs and the corresponding counters (e.g., RB1 [Tx-RB1 Counter, Rx-RB1 Counter], RB2 [Tx-RB2 Counter, Rx-RB2 Counter]). In 310, the first UE transmits, i.e. signals, the counter check request to the second UE.

In 315, upon receipt of the counter check request, the second UE generates a response to the counter check request for each SL data radio bearer (DRB). The following description provides examples of operations related to established DRBs. Exemplary operations for non-established DRBs will be provided below. For established DRBs, if no count exists for a given transmission direction, e.g. because the DRB is a unidirectional bearer configured only for the other direction, the count value is assumed to be zero for the IE corresponding to the unused direction. For established DRBs not included in the request, the second UE may include in the response a counter set for each of the DRBs by including IEs for the SL RB ID with the counters set to the values of TX_NEXT-1 and RX_NEXT-1. If, for at least one direction for a particular SL RB, the most significant bits of the count are different from the value indicated in the request message, the SL RB is included in the response with the SL RB ID and/or the SL logical channel ID with the counters set to the values of TX_NEXT-1 and RX_NEXT-1.

For each DRB that is not established, the second UE includes in the response the non-established SL DRB IDs, with the most significant bits of the count set identical to the corresponding values in the request message and the least significant bits set to zero. In 320, the second UE transmits, i.e. signals, the counter check request to the first UE.

In 325, upon receipt of the counter check response, the first UE determines whether a counter mismatch exists. The first UE determines a difference between the counts of the first UE and the counts of the second UE for each of the SL DRBs and compares the difference to a threshold value. The threshold may be configured by the NW in RRC signaling (SIB, or dedicated signaling), preconfigured between network provider and UE provider, or decided by UE implementation, (e.g., based on an application executing on the UE, based on the type of UE, etc.). In some exemplary embodiments, the threshold value may be constant. In other exemplary embodiments, the threshold value may be scaled according to a characteristic of the SL DRB such as data rate, e.g., a higher date rate would allow for a higher threshold value.

In 330, when a counter mismatch is determined to exist, the counter mismatch is declared, and the connection may be released by the first UE. For example, the first UE may send an RRCReleaseSidelink or an RRCReconfigurationFailureSidelink message to the second UE, indicating the cause value as "counter mismatch" or "security problem." If either of the first UE or the second UE is in the RRC connected state with a network, e.g. the 5G RAN 120, the either UE may report the SLUEinformation to the network, indicating the release/failure cause is "counter mismatch" or "security problem." In this manner, the 5G RAN 120 may understand that there may have been an attack on the UEs via the sidelink connection.

The above-described mechanism may be employed when unicast security is turned off or may be employed as a backup security measure even when unicast security is turned on. A counter mismatch determination may indicate the presence of an attacking device intercepting transmissions or inserting malicious transmissions between two UEs in SL communication. The exemplary count mechanism allows the UEs to protect against such malicious attacks.

As mentioned above, a second aspect of the exemplary embodiments relates to PDCP entity re-establishment between two UEs in SL communication. The PDCP layer supports security functions, e.g. integrity, ciphering and header compression and runs on top of the RLC layer. When the security key refreshes, re-establishment of the PDCP is performed. Re-establishment of the PDCP may be a procedure that is performed when an upper layer performs rekeying.

In general, rekeying ensures that fresh session keys (KNPR-sess) are used and may also refresh the KNPR. Either UE in SL communications may rekey the connection at any time before the counter for a PDCP bearer repeats with the current keys.

Figure 4:
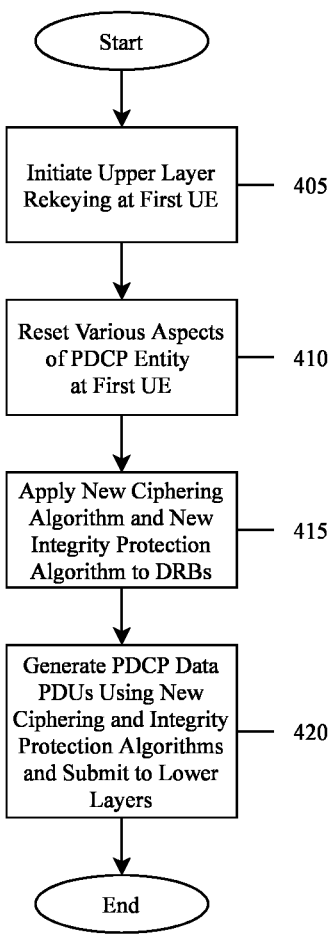
FIG. 4 shows a method for PDCP re-establishment at a first, transmitting UE in SL communication with a second, receiving UE according to various exemplary embodiments.

FIG. 4 shows a method 400 for PDCP re-establishment at a first, transmitting UE in SL communication with a second, receiving UE. As described above, either UE in SL communication may rekey the connection. Thus, the method 400 may be performed by either the UE 110 or the UE 112 that have established an SL connection.

In 405, an upper layer rekeying is initiated at the first UE. In 410, various aspects of the PDCP entity at the first UE are reset. For example, for both acknowledged (AM) and unacknowledged (UM) DRBs, a header compression protocol for the SL may be reset so that an initial Initialization & Refresh (IR) state in Uni-directional (U-mode) is established. For all UM DRBs and Signaling Radio Bearers (SRBs), TX_NEXT may be set to an initial value. For SRBs, all stored PDCP service data units (SDUs) and protocol data units (PDUs) may be discarded.

In 415, a new ciphering algorithm and a new integrity protection algorithm are applied to the DRBs. The new algorithms are provided by upper layers during the PDCP entity rekeying procedure.

In 420, PDCP Data PDUs are generated using the new ciphering and integrity protection algorithms. Specifically, for UM DRBs, for each PDCP SDU already associated with a PDCP Sequence Number (SN) but for which a corresponding PDU has not previously been submitted to lower layers, a header compression of the PDCP SDU is performed, integrity protection and ciphering are performed using the count value associated with the PDCP SDU, and the resulting PDCP Data PDU is submitted to lower layers.

For AM DRBs, from the first PDCP SDU for which successful delivery of the corresponding PDCP Data PDU has not been confirmed by lower layers, transmission or retransmission is performed for all the PDCP SDUs already associated PDCP SNs in ascending order of the COUNT values associated to the PDCP SDU prior to the re-establishment initiation. Similar to the UM DRBs discussed above, a header compression for each of these PDCP SDUs is performed, integrity protection and ciphering are performed using the count value associated with the PDCP SDU, and the resulting PDCP Data PDU is submitted to lower layers.

Figure 5:
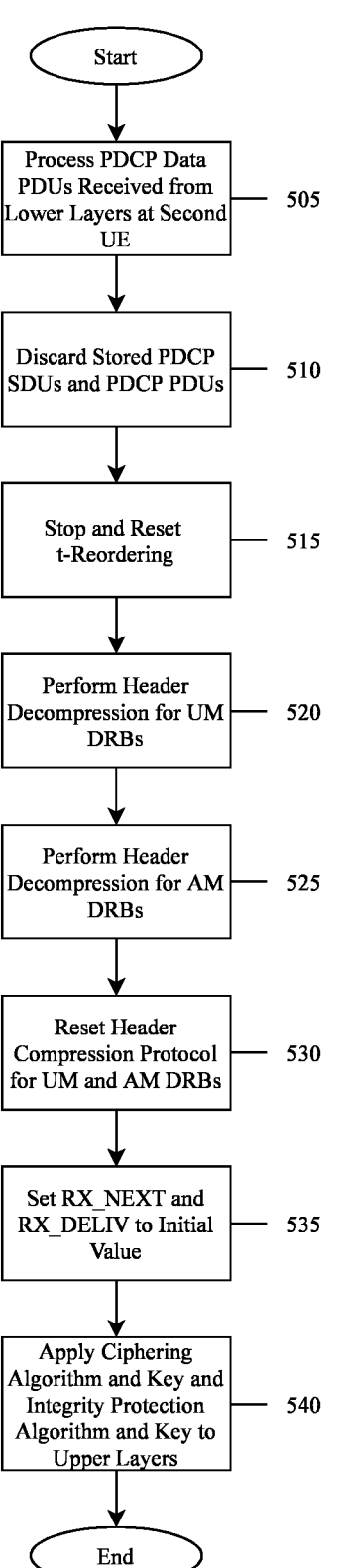
FIG. 5 shows a method for PDCP re-establishment at the second UE of FIG. 4 according to various exemplary embodiments.

The aforementioned method 400 re-establishes the lower layers for the SL connection and ends the method for the first UE. FIG. 5 shows a method 500 for PDCP re-establishment at the second UE. In 505, the receiving UE processes the PDCP Data PDUs received from the lower layers due to the re-establishment of the lower layers.

In 510, the stored PDCP SDUs and PDCP PDUs are discarded. In 515, for SRBs and UM DRBs having t-Reordering running, t-Reordering is stopped and reset. In 520, for UM DRBs, header decompression is performed and all stored PDCP SDUs are delivered to the upper layers in ascending order of associated COUNT values. In 525, for AM DRBs, header decompression is performed for all stored PDCP SDUs if drb-ContinueROHC is not configured.

In 530, for UM DRBs and AM DRBs, the header compression protocol for sidelink is reset and NC state in U-mode is started. In 535, for UM DRBs and SRBs, RX_NEXT and RX DELIV are set to the initial value. In 540, the ciphering algorithm and key and integrity protection algorithm and key provided by the upper layers during the PDCP re-establishment procedure are applied.

Thus, performing the methods 400 and 500 will result in the rekeying process being completed between the UEs that have a sidelink connection.

As mentioned above, the third aspect of the exemplary embodiments relates to a PDCP duplication scenario where multiple logical RLC entities are used (thus multiple logical channels are used) and it is unclear which logical channel ID is to be used as input for the security algorithm at the PDCP layer.

Figure 6:
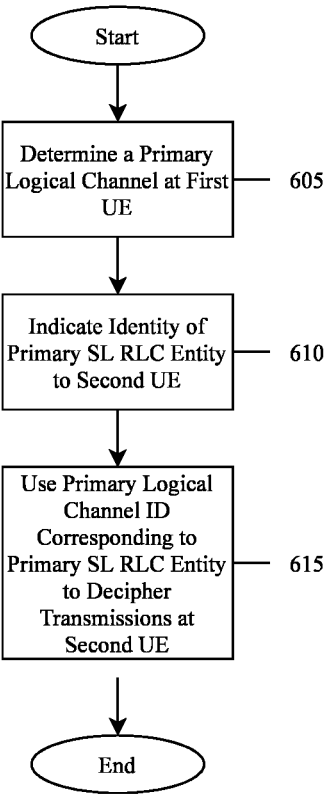
FIG. 6 shows a method for configuring a primary SL RLC entity for use as a security algorithm in the PDCP layer when PDCP duplication is in use according to various exemplary embodiments.

FIG. 6 shows a method 600 for configuring a primary SL RLC entity for use as a security algorithm in the PDCP layer when PDCP duplication is in use.

In 605, a first, transmitting UE operating with PDCP duplication determines a primary SL RLC entity as that which carries the PDCP control PDU. Only one of the multiple channels in the PDCP duplication carries the PDCP control PDU. In 610, the first UE indicates to a second, receiving UE that PDCP duplication is in use for one SL RB and the identity of the primary SL RLC entity through an RRCReconfigurationSidelink message.

In 615, the second UE uses the primary SL logical channel ID corresponding to the primary SL RLC entity to decipher transmissions and IP check.

Thus, at the completion of method 600, both UEs in the SL connection will understand which logical channel ID to use for the SL bearer. It should be understood that the method 600 may apply to carrier aggregation (CA) based PDCP duplication that is applicable to intra-RAT PDCP duplication. In addition, the method 600 may be applied to dual connectivity (DC) based PDCP duplication that is applicable to inter-RAT PDCP duplication (e.g., NR SL and LTE SL).

The following provides examples of the first aspect of the exemplary embodiments.

A first example includes a method performed by a first user equipment (UE) configured with a sidelink (SL) connection with a second UE. The method includes generating an SL counter check request comprising at least a first count for data transmissions from the first UE to the second UE as determined by the first UE, transmitting the request to the second UE, receiving a counter check response to the request, the response comprising at least a second count for data transmissions from the first UE to the second UE as determined by the second UE, determining a first difference between the first count and the second count and when the first difference exceeds a threshold, releasing the SL connection with the second UE.

A second example includes a first user equipment (UE) having a transceiver and a processor. The transceiver is configured to connect to a second UE via a sidelink (SL) connection. The processor is configured to generate an SL counter check request comprising at least a first count for data transmissions from the first UE to the second UE as determined by the first UE, receive a counter check response to the request, the response comprising at least a second count for data transmissions from the first UE to the second UE as determined by the second UE, determine a first difference between the first count and the second count and when the first difference exceeds a threshold, release the SL connection with the second UE.

A third example includes a method performed by a first user equipment (UE) configured with a sidelink (SL) connection with a second UE. The method includes receiving an SL counter check request from the second UE, the request comprising at least a first count for data transmissions from the second UE to the first UE as determined by the second UE, generating a counter check response to the request, the response comprising at least a second count for data transmissions from the second UE to the first UE as determined by the first UE, transmitting the response to the second UE and receiving a message from the second UE releasing the SL connection, wherein the message includes a cause for releasing the SL connection.

The third example further includes, when the request does not include a radio bearer (RB) identification (ID), the response is generated comprising RB IDs for RBs established for data transmission on the SL connection.

The third example further includes, when the message releasing the SL connection is received and the first UE is in an RRC connected state with a cellular network, reporting the release of the SL connection to the cellular network including the cause included in the message.

A fourth example includes a first user equipment (UE) having a transceiver and a processor. The transceiver is configured to connect to a second UE via a sidelink (SL) connection. The processor is configured to receive an SL counter check request from the second UE, the request comprising at least a first count for data transmissions from the second UE to the first UE as determined by the second UE, generate a counter check response to the request, the response comprising at least a second count for data transmissions from the second UE to the first UE as determined by the first UE, and receive a message from the second UE releasing the SL connection, wherein the message includes a cause for releasing the SL connection.

The following provides examples of the second aspect of the exemplary embodiments.

A fifth example includes a method performed by a first user equipment (UE) configured with a sidelink (SL) connection with a second UE. The method includes initiating an upper layer rekeying, resetting a header compression protocol for the SL connection for data radio bearers (DRBs) used in the SL connection and discarding all stored packet data convergence protocol (PDCP) protocol data units (PDUs) and service data units (SDUs), applying a new ciphering algorithm and a new integrity protection algorithm to the DRBs, generating updated PDCP PDUs using the new ciphering and integrity protection algorithms and submitting the updated PDCP PDUs to lower layers.

A sixth example includes a first user equipment (UE) having a transceiver and a processor. The transceiver is configured to connect to a second UE via a sidelink (SL) connection. The processor is configured to initiate an upper layer rekeying, reset a header compression protocol for the SL connection for data radio bearers (DRBs) used in the SL connection and discarding all stored packet data convergence protocol (PDCP) protocol data units (PDUs) and service data units (SDUs), apply a new ciphering algorithm and a new integrity protection algorithm to the DRBs, generate updated PDCP PDUs using the new ciphering and integrity protection algorithms and submit the updated PDCP PDUs to lower layers.

A seventh example includes a method performed by a first user equipment configured with a sidelink (SL) connection with a second UE. The method includes receiving a rekeying request from the second UE, receiving updated packet data convergence protocol (PDCP) protocol data units (PDUs) from lower layers, discarding all stored PDCP PDUs and service data units (SDUs), performing header compression on the updated PDCP PDUs and applying a new ciphering algorithm and a new integrity protection algorithm to data radio bearers (DRBs) used in the SL connection.

An eighth example includes a first user equipment (UE) having a transceiver and a processor. The transceiver is configured to connect to a second UE via a sidelink (SL) connection. The processor is configured to receive a rekeying request from the second UE, receive updated packet data convergence protocol (PDCP) protocol data units (PDUs) from lower layers, discard all stored PDCP PDUs and service data units (SDUs), perform header compression on the updated PDCP PDUs and apply a new ciphering algorithm and a new integrity protection algorithm to data radio bearers (DRBs) used in the SL connection.

The following provides examples of the third aspect of the exemplary embodiments.

A ninth example includes a method performed by a first user equipment (UE) configured with a sidelink (SL) connection with a second UE and operating with packet data convergence protocol (PDCP) duplication, where multiple logical channels are used. The method includes determining a primary SL RLC entity corresponding to a primary logical channel, the primary SL RLC entity having a primary SL RLC identifier (ID) and the primary logical channel having a primary logical channel ID and transmitting to the second UE an indication that PDCP duplication is in use and the primary SL RLC ID, wherein the second UE uses the primary logical channel ID corresponding to the primary SL RLC ID to decipher transmissions from the first UE.

A tenth example includes a first user equipment (UE) having a transceiver and a processor that is configured to operate with packet data convergence protocol (PDCP) duplication, where multiple logical channels are used. The transceiver is configured to connect to a second UE via a sidelink (SL) connection. The processor is configured to determine a primary SL RLC entity corresponding to a primary logical channel, the primary SL RLC entity having a primary SL RLC identifier (ID) and the primary logical channel having a primary logical channel ID, wherein the transceiver is further configured to transmit to the second UE an indication that PDCP duplication is in use and the primary SL RLC ID, wherein the second UE uses the primary logical channel ID corresponding to the primary SL RLC ID to decipher transmissions from the first UE.

An eleventh example includes a method performed by a first user equipment (UE) configured with a sidelink (SL) connection with a second UE and operating with packet data convergence protocol (PDCP) duplication, where multiple logical channels are used. The method includes receiving an indication that PDCP duplication is in use and a primary SL RLC ID and using a primary logical channel ID corresponding to the primary SL RLC ID to decipher transmissions from the first UE.

A twelfth example includes a first user equipment (UE) having a transceiver and a processor that is configured to operate with packet data convergence protocol (PDCP) duplication, where multiple logical channels are used. The transceiver is configured to connect to a second UE via a sidelink (SL) connection. The processor is configured to receive an indication that PDCP duplication is in use and a primary SL RLC ID and use a primary logical channel ID corresponding to the primary SL RLC ID to decipher transmissions from the first UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

What is claimed:

1. A non-transitory computer readable storage medium comprising a set of instructions, wherein the set of instructions when executed by a processor cause the processor to perform operations, comprising:

at a first user equipment (UE) configured with a sidelink (SL) connection with a second UE:

generating an SL counter check request comprising at least a first count for data transmissions from the first UE to the second UE as determined by the first UE;

transmitting the request to the second UE;

receiving a counter check response to the request, the response comprising at least a second count for data transmissions from the first UE to the second UE as determined by the second UE;

determining a first difference between the first count and the second count; and when the first difference exceeds a threshold, releasing the SL connection with the second UE, wherein the threshold is based on at least a data rate on the SL connection, wherein releasing the SL connection with the second UE comprises sending the second UE a RRCReleaseSidelink message indicating a cause of the release.

2. The non-transitory computer readable storage medium of claim 1, wherein the request comprises a third count for data transmissions from the second UE to the first UE as determined by the first UE and the response comprises a fourth count for data transmissions from the second UE to the first UE as determined by the second UE, the operations further comprising:

determining a second difference between the third count and the fourth count; and when the second difference exceeds the threshold, releasing the SL connection with the second UE.

3. The non-transitory computer readable storage medium of claim 1, wherein the request comprises one of a first radio bearer identifier (RB ID) or a first logical channel ID, the first count corresponding to data transmissions over the one of the first RB ID or the first logical channel ID.

4. The non-transitory computer readable storage medium of claim 3, wherein the request comprises one of a second RB ID or a second logical channel ID, wherein the request comprises a fifth count for data transmissions over the one of the second RB ID or the second logical channel.

5. The non-transitory computer readable storage medium of claim 1, wherein the operations further comprise:

when the first UE releases the SL connection with the second UE and is in an RRC connected state with a cellular network, reporting the release of the SL connection to the cellular network.

6. The non-transitory computer readable storage medium of claim 1, wherein the threshold is one of (i) configured by a cellular network, (ii) preconfigured or (iii) determined by the first UE based on a characteristic of the first UE or an application executing on the first UE.

7. The non-transitory computer readable storage medium of claim 2, wherein, when an SL connection is uni-directional, one of the first count or the third count is set to 0.

8. The non-transitory computer readable storage medium of claim 1, wherein the first count and the second count comprise at least one most significant bit and at least one bit of lesser significance.

9. A non-transitory computer readable storage medium comprising a set of instructions, wherein the set of instructions when executed by a processor cause the processor to perform operations, comprising:

at a first user equipment (UE) configured with a sidelink (SL) connection with a second UE:

performing, for sidelink acknowledged (AM) data radio bearers (DRBs), header decompression for all stored packet data convergence protocol data units (PDUs);

applying a new ciphering algorithm and a new integrity protection algorithm to the DRBs;

resetting, for the AM DRBs, the header compression protocol; and starting, for the AM DRBs, NC state in U-mode.

10. The non-transitory computer readable storage medium of claim 9, wherein the new ciphering algorithm and the new integrity protection algorithm are provided by upper layers during the upper layer rekeying.

11. The non-transitory computer readable storage medium of claim 9, wherein a header compression protocol is reset for the AM DRBs and unacknowledged (UM) DRBs.

12. The non-transitory computer readable storage medium of claim 11, wherein, for the UM DRBs, the applying, generating and submitting are performed for each PDCP SDU associated with a PDCP Sequence Number (SN) for which a corresponding PDU has not been submitted to the lower layers.

13. The non-transitory computer readable storage medium of claim 11, wherein, for the AM DRBs, the applying, generating and submitting are performed for each PDCP SDU for which a successful delivery of a corresponding PDCP data PDU has not been confirmed by the lower layers.

14. The non-transitory computer readable storage medium of claim 9, wherein the operations are performed prior to a counter for a PDCP bearer repeats with current keys.

15. A non-transitory computer readable storage medium comprising a set of instructions, wherein the set of instructions when executed by a processor cause the processor to perform operations, comprising:

at a first user equipment (UE) configured with a sidelink (SL) connection with a second UE and operating with packet data convergence protocol (PDCP) duplication, where multiple logical channels are used:

determining a primary SL RLC entity corresponding to a primary logical channel, the primary SL RLC entity having a primary SL RLC identifier (ID) and the primary logical channel having a primary logical channel ID; and transmitting to the second UE an indication that PDCP duplication is in use and the primary SL RLC ID, wherein the second UE uses the primary logical channel ID corresponding to the primary SL RLC ID to decipher transmissions from the first UE.

16. The non-transitory computer readable storage medium of claim 15, wherein the PDCP duplication is based on first UE operating in a carrier aggregation (CA) state.

17. The non-transitory computer readable storage medium of claim 15, wherein the PDCP duplication is based on first UE operating in a dual connectivity (DC) state.

\* \* \* \* \*